United States Patent Office 3,347,798
Patented Oct. 17, 1967

3,347,798
PRODUCTION OF CATALYSTS OR CATALYST CARRIERS IN THE FORM OF HOLLOW BEADS
Karl Baer, Weinheim, Heinrich Sperber, Ludwigshafen (Rhine), Otto Goehre, Heidelberg, and Gerhard Leibner, Ludwigshafen (Rhine), Germany, assignors to Badische Anilin- & Soda-Fabrik Aktiengesellschaft, Ludwigshafen (Rhine), Germany
No Drawing. Filed June 10, 1964, Ser. No. 374,179
Claims priority, application Germany, June 14, 1963, B 72,282; May 13, 1964, B 76,739
8 Claims. (Cl. 252—448)

This invention relates to the production of catalysts or catalyst carriers in the form of hollow beads. More specifically, the invention relates to the production of catalysts by providing hollow beads with a catalytically active substance.

Finely divided catalysts in a fluidized bed are preferred for catalytic processes. These catalysts may be prepared by grinding solid catalytically active substances or by grinding solid inert substances which are used as carriers. In this method of preparation, a considerable fraction is wasted by the formation of extremely fine, dusty constituents. Moreover, the catalyst particles thus prepared are exposed to marked attrition and owing to their irregular shape exhibit unsatisfactory fluidizing behavior. There has therefore been a change-over to imparting a spherical shape to such catalysts, for example by moving a sol through a water-insoluble medium, such as oil, under such conditions that the sol droplets are converted into spherical gel particles which are then allowed to solidify. This method is however confined to sols as initial materials. Spherical catalyst particles have also been obtained by spray-drying gels. While these beads are more resistant to attrition than ground solids, they are not durable enough owing to the brittleness, for example upon elastic shock, because marked internal stresses occur during drying of the beads.

We have now found that improved attrition resistance and service life and at the same time an improvement in the catalytic activity owing to an enlarged geometric surface of the beads are achieved by using catalysts or catalyst carriers in the form of hollow beads having cavities which are accessible from outside. Catalysts or catalyst carriers of this type are obtained by spraying a hydrogel containing at least 30% by weight of water, suspension and/or solution of a metal compound, advantageously after having been heated, at a pressure of 10 to 100 atmospheres advantageously in the presence of an expanding agent, through one or more nozzles into a tower shaped vessel, and at the same time introducing a gas heated to 300° to 700° C. in an amount of 4 to 18 cubic meters per kilogram of initial material in the neighborhood of at least one of the nozzles.

In the new process it is advantageous to correlate the pressure, the opening in each nozzle and the hourly throughput of the substance to be sprayed so that at least 80% of all the sieve fractions of the final beads have a diameter of more than 90 microns. If the characteristic of the beads is based on the grain size characteristics $\delta^1$ and the uniformity coefficient $n$ according to Puffe, the value for these hollow beads lies between $\delta^1=0.13$ at $n=5$ and $\delta^1=0.35$ at $n=3$ (see E. Puffe, Zeitschrift für Erzbergbau und Metallhüttenwesen, volume 1 (1948), part 4, page 97 et seq.).

The catalytic activity of a catalyst particle is known to depend on the size of the geometric surface. In the case of spherical particles, diffusion, which effects exchange with the active places in the interior of the bead, proceeds too slowly. Sometimes, even in the case of carriers, it is not possible to utilize the whole inner surface. In the case of a hollow sphere, however, the geometric surface for the same radius is about twice as great as with the spherical shape. Diffusion into the interior of the sphere is facilitated and the whole surface thus becomes catalytically active. Moreover owing to the low inner stress of a hollow sphere, it has a longer service life, better mechanical resistance and advantages in supply and withdrawal of heat at the catalytically active centers of the particles. The hollow spheres are exposed to only slight mechanical abrasion and offer resistance to mechanical stresses, for example in a fluidized bed, even when brittle and hard materials are used, as in the case of silica gel. In the event of deposits of carbon and the like on the surface of the catalyst and mechanical stresses thereby set up, hollow spherical particles are also stable.

Suitable initial materials for the production of catalyst particles according to this invention are silicic acid hydrogels or alumina hydrogels, and also hydrogels of silicates and titanium dioxide, which are usually present in the form of a viscous mass having a solids concentration of between 15 and 40% by weight, particularly between 15 and 30% by weight.

For example silicic acid hydrogels obtained from waterglass are suitable. They are obtained by conventional methods by precipitating the gel from waterglass in suitable dilution, for example at a density of 1.15 to 1.25 g./ccm., at room temperature or slightly elevated temperature with a mineral acid while mixing well. A solution of one or more metal compounds, for example a solution of an aluminum, magnesium or zinc salt, may also be added to the waterglass. Useful alumina hydrogels are obtained by precipitation from solutions of aluminum salts.

Metal compounds, for example compounds of copper, silver, zinc, magnesium, aluminum, tin, lead, vanadium, chromium, molybdenum, tungsten, manganese, iron, nickel, cobalt, platinum, palladium or mixtures of the same may also be processed into hollow spherical particles by the process according to this invention. Examples of suitable compounds are the oxides, hydroxides, carbonates, nitrates, oxalates, acetates, formates and sulfides and also ammonium, phosphorus and boron complexes. It is advantageous to use them as hydrogels or in association with a hydrogel. The metal compounds are processed either in finely divided conditions as a suspension in at least 30% by weight of water or a volatile organic liquid, such as alcohol or gasoline, or sprayed as an aqueous or alcoholic solution which becomes viscous by evaporation or by the formation of drops owing to its thixotropic property. It is advantageous to use salts of readily volatile and diffcultly volatile acids, for example a mixture of nitrates and salts of phosphoric acid. Gels or solid metal compounds are advantageously peptized with 0.3 to 5% by weight of a dilute acid, for example nitric acid, sulfuric acid, phosphoric acid, halogen hydracids, such as hydrochloric acid, and also acetic acid. Dilute alkalies may also be used. For the peptization, the gel or the metal compound may be sprayed for example with 0.5 to 2% by weight of acid and then mixed well. The mass is then ground in a mill, for example a toothed disc mill or a corundum disc mill, until the mixture has become finely divided and mobile. It is however also possible to subject the solids to the grinding process without previous peptization. A uniform product is similarly obtained by prolonged and intense grinding. If necessary the solids content should be decreased to 5 to 15% by weight by adding water. During grinding, sufficient heat is usually liberated to make additional heating of the initial material unnecessary. It is advantageous to add a portion of the ground material, for example 3 to 60% by weight, particularly 3 to 30% by weight, to the mixture prior to grinding. This will ensure that the grinding process is shorter and easier and the ground material more homogeneous. For the same purpose, 1 to 10%, particularly 2 to 8%, of the hollow spherical particles of catalyst or catalyst carrier may be added to the pasty mixture prior to grinding. The cavities of the beads are thus better formed. Peptization can be improved by supplying a part of the ground material before or during the addition of the peptizing agent.

In carrying out the process, the hydrogels, suspensions or solutions, advantageously in the most concentrated form possible and after having been heated to 30° to 90° C., are forced at a pressure of 10 to 100 atmospheres, particularly at about 20 to 85 atmospheres, through a nozzle having an opening of about 0.5 to 4 mm., particularly 1.2 to 3.5 mm. The nozzle is situated at the upper end of a vertical spray tower. If the spraying cone has an angle of 30°, the gas inlet may be near the nozzle, and when the spray cone has a larger angle, for example 60°, introduction of gas may be distributed over the entire cross-sectional area of the tower. The initial material and the gas pass cocurrent through the spray tower. The gas is heated up to about 300° to 700° C., particularly 350° to 650° C., and introduced into the spray tower in an amount of 4 to 15 cubic meters, advantageously 5 to 10 cubic meters, per kg. of initial material.

The temperature and amount of gas in relation to the amount of initial material sprayed in per unit of time are particularly important for the construction of the hollow bead. An advantageous adjustment is a mean temperature drop of at least 50° C. per meter, for example 50° to 100° C. per meter from the gas inlet in the direction of flow to the middle of the tower. The droplets should form an extensible but already tough skin in the neighborhood of the nozzle. This process may be promoted by introducing cold air beside the nozzle. When the droplets pass into the hot gas current, the enclosed liquid should evaporate rapidly. The heat supplied must also be sufficient to effect evaporation of the bulk of the liquid present in the shell and/or decomposition of the metal compound. The thin surface layer of the droplets is stretched until finally a hollow bead is formed by the droplet bursting at one point. Nitrates, oxalates, acetates and formates which decompose at the treatment temperature, or substances which contain water of crystallization and which give off their crystal water in the form of vapor at the treatment temperature are very suitable. It is advantageous however to add expanding agents, for example readily vaporizable or readily decomposable substances in an amount of 0.3 to 10% by weight, particularly 0.5 to 8% by weight, for example ammonia or ammonium salts, such as ammonium acetate, ammonium carbonate or ammonium nitrate, and also liquefied gases, such as ammonia or sulfur dioxide, low boiling amines, and also nitric acid, acetic acid and formic acid, their salts, or borax or boron phosphate.

The substances used for the peptization may also serve as expanding agents.

The drying period increases very rapidly with the size of the primary particles. In view of the high water contents of the materials used, very large drying towers would seen to be necessary for the production of particles having a diameter of more than 100 microns. Surprisingly, however, dryers of conventional design may be used. In general, drying towers having a height of 8 to 15 m., particularly 10 to 12 m., and a diameter of about 3 m. are required for carrying out the process at an hourly throughput of about 300 to 600 kg., particularly 350 to 500 kg., or towers having a diameter of about 2 m. at an hourly throughput of about 120 to about 280 kg., of initial material. Residence periods in the drying tower are about twenty to one hundred seconds.

Hollow beads prepared according to this invention, particularly those obtained from hydrogels, have particularly good catalytic properties if they show a maximum at about $10^4$ and $10^5$ A. in the pore distribution curve determined by the mercury method. The total volume of the macropores is usually between 0.05 and 0.3, particularly between 0.07 and 0.15 ccm./g.

Besides the possibility as described above of direct processing of metal compounds for example from suspensions according to this invention, there is also the possibility of heating hollow beads produced from hydrogels to temperatures of at least 400° C., particularly from 450° to 700° C. By this method, which is carried out as it were in two stages, the hollow spherical carrier being prepared in the first stage and the catalytically active substance then applied to it, very active catalysts are obtained. This method also permits the production of a uniform carrier for several catalyses to which there are then applied the various catalytically active metallic components for the specific reaction.

In this embodiment of the process, a silicic acid hydrogel, alumina hydrogel or hydrogels of silicates and titanium oxide, which have a solids concentration of 15 to 40% by weight are used as initial materials. It is advantageous to use silicic acid hydrogels which have been obtained from waterglass. The acid may be introduced into the waterglass solution in order to set up the required acidity, for example a pH value of 2 to 5. The hydrogel then forms in the solution. It is however possible to add to the waterglass solution only such an amount of mineral acid that the hydrogel forms at a pH of more than 7. It is also possible to precipitate the hydrogel by means of a precipitant, for example ammonia or ammonium salts, from the waterglass solution which may if desired have been provided with acid. Mixtures of hydrogels formed in these various ways may also be used. The gels are treated with water, acidified water and/or ammoniacal water at room temperature or slightly elevated temperature. A solution of one or more metal compounds, for example a solution of an aluminum, magnesium, zirconium or zinc salt, may also be added to the waterglass. Useful alumina hydrogels are obtained by precipitation from solutions of aluminum salts, aluminates, alcoholates or activated aluminum and water.

The procedure for the production of the hollow beads from the hydrogels has already been explained in detail above. The hollow beads are then heated to temperatures of at least 400° C., particularly at from 450° to 700° C., in a further treatment; a definite temperature may be maintained, or the material may be exposed to heat within a temperature range with a rising temperature, for example from 500° to 650° C., for a definite period. At the lower temperatures, half to two hours is usually required for the preheating. At temperatures of 550° to 650° C., treatment periods of only ten to thirty minutes are adequate. At even higher temperatures, the period may if desired be shortened further. The heating may be carried out in the presence of gases, for example air or nitrogen.

After the heat treatment, the catalytically active substance is applied by impregnation or spraying on. It is preferably applied by impregnating the hollow beads with solutions of a metal compound. Aqueous or organic solutions, for example alcoholic solutions, may be used. All metal compounds which are normally applied to conventional carriers may be used as catalytically active substances, for example compounds of copper, silver, zinc, magnesium, aluminum, tin, lead, vanadium, chromium, molybdenum, tungsten, manganese, iron, nickel, cobalt, platinum, palladium or mixtures of the same. Examples of suitable compounds are oxides, hydroxides, carbonates, nitrates, oxalates, acetates, formates, sulfides and also ammonium, phosphorus and boron complexes. It is advantageous to use mixtures of salts of easily volatile and difficultly volatile acids, for example a mixture of nitrates and salts of phosphoric acid.

Prior to, or after, impregnation with a solution of a metal compound, the hollow beads may also be provided with a halogen, such as fluorine, chlorine, bromine or iodine, a halogen hydracid or another halogen compound or acids, such as phosphoric acid, pyrophosphoric acid, nitric acid, acetic acid or oxalaic acid, in small amounts, for example 0.1 to 5% by weight.

The catalyst is then dried and heated to 400° to 700° C. The hollow beads may also be mixed in the dry state with decomposable metal compounds, for example with a nitrate, an ammonium compound or an organic compound, and then heated to 400° to 700° C.

By reason of their hollow spherical construction, the catalysts and/or catalyst carriers have advantages, particularly in catalytic fluidized bed reactions, over the compact bead catalysts hitherto used. Application of the catalytically active substances, for example compounds of metals or phosphoric acid, is carried out by conventional methods, for example after pretreatment with halogen or halogen compounds. The catalysts may be used for carrying out a great variety of fluidized bed reactions at atmospheric or superatmospheric pressure, for example in the hydrogenation, oxidation, dehydrogenation, dehydration, polymerization, condensation, amination, reduction of aromatic nitro compounds, cracking, refining and reforming of hydrocarbons, alkylation of hydrocarbons or their derivatives, and also aromatic amino, nitro and aminonitro compounds by reduction or reaction with alcohols, and also the production of alkanolamines, diamines, diphenylamine and imines. Higher yields and/or more prolonged cycles between regenerations are achieved than with the prior art catalysts.

The invention is further illustrated by the following examples.

*Example 1*

About 400 kg. of silicic acid hydrogel having a pH value of 8 and containing 83% of water, 0.1% of ammonia and 0.2% of Na$_2$O is introduced hourly into a container having a capacity of about 2 cu. m. At the same time and within the same period about 4 kg. of 65% nitric acid is sprayed onto the continuously added hydrogel. The material which is kept viscous by stirring is brought into a toothed disc mill and intensely ground therein with 15% by weight of the ground material being returned. During grinding, the liquid mass heats up to about 80° C. The mass is sprayed by means of a high pressure pump at a pressure of 50 atmospheres through a nozzle having a 1.8 mm. bore into the upper portion of a drying tower 11 m. in height and 3 m. in diameter. At the same time, 200 cu. m. (S.T.P.) per hour of unheated air is passed in around the nozzle and 5000 cu. m. (S.T.P.) of dry air which has been heated to 550° C. is passed in per hour through several points beside the nozzle. The spray cone has an angle of 30°. A temperature of 190° C. is thus set up at the lower end of the drying tower. The temperature in the middle of the tower is about 30° C. above the outlet temperature, i.e. about 220° C. The end product contains 5.5% of adsorbed water. The grain size characteristic is 0.15 mm. and the uniformity coefficient 3.2. 82% of all sieve constituents are more than 90 microns. The dried material has well formed beads which exhibit at one or more points access to the cavities in the interior. If some of these beads are broken open it is found that the bulk of them are hollow beads in the form of shells.

If each 400 kg. of silicic acid hydrogel jelly has added to it about 20 kg. of dried catalyst, the viscosity of the mass to be sprayed is increased somewhat and the hollow spherical shape forms better. When 20 kg. of already dried catalyst is added to each 400 kg. of original hydrogel, the powder density falls from 450 g./l. to about 360 g./l.

*Example 2*

An aluminum oxide hydrogel with 80% of ammoniacal water is peptized with 1% of acetic acid, with reference to the gel, while stirring. The mass is then ground in a corundum disc mill, a temperature of 40° C. thus being set up. The mass is further heated to 85° C. As in Example 1, 500 kg. of the mass is sprayed under a pressure of 60 atmospheres through a nozzle having a 2.8 mm. bore into the upper end of a drying tower. 4000 cu. m. (S.T.P.) of air which has been heated to 580° C. is introduced into the tower through five openings near to the nozzle. There is a temperature gradient of 76° C./m. from the gas inlet to the middle of the tower. Hollow beads having about the same size as in Example 1 are obtained.

*Example 3*

An aluminum hydroxide gel having 80% of water is diluted with such an amount of ammonia water that the solids content of the mixture is 14%. The mass is ground in a corundum disc mill, a temperature of 40° C. being set up. Further processing is carried out as in Example 2 in a nozzle having a 2.5 mm. bore at an hourly throughput of 420 kg. and at a pressure of 50 atmospheres. The hollow beads have the following grain sizes:

$\delta^1 = 0.18$, $n = 3.6$; 94% have a diameter of more than 90 microns.

*Example 4*

A solution of aluminum nitrate containing 4% of aluminum is mixed with the equivalent amount of a 50% solution of phosphoric acid. The solution is heated to 35° C. and sprayed into a drying tower. 3000 cu. m. (S.T.P.) of dry air at 600° C. is introduced at points distributed over the cross-section of the tower at the height of the nozzle cocurrently with 400 kg. of solution introduced per hour. The pressure is 20 atmospheres and the nozzle has a 2.3 mm. opening. The spray cone forms an angle of 60°. A temperature of 190° C. is set up in the middle of the tower. Hollow beads are obtained of which 95% have a diameter of more than 90 microns and the following grain sizes:

$\delta^1 = 0.17$ and $n = 4.5$.

*Example 5*

500 kg. of a jelly of silica gel containing 17% of solids (which has been precipitated by introducing waterglass solution into sulphuric acid at a pH value of less than 3 and washing the product with ammonia water) is mixed with 500 kg. of a silica gel having 25% of solids (which has been precipitated from the same initial components by adding sulphuric acid to waterglass solution at a pH value of less than 8 and washing the product with water) and 42 kg. of copper is added in the form of a 12% copper tetramine hydroxide solution. The whole is ground in a corundum disc mill and injected at 60° C. through a nozzle having a 2.1 mm. bore into the above-mentioned drying tower at a pressure of 55 atmospheres. With an hourly throughput of 400 kg. of this mixture, 3500 cu. m. (S.T.P.) of dry air which has been heated to 600° C. is introduced at the same time at several points near the nozzle. The temperature drops by 80° C. per m. from the gas inlet to the middle of the tower. 99% of the hollow beads have a diameter of more than 90 microns. The grain sizes are: $\delta^1 = 0.25$ and $n = 5$.

This catalyst is annealed at 400° C. and used for the hydrogenation of nitrobenzene at 280° to 290° C. At a throughput of 0.84 kg. of liquid initial material per hour, it is possible to pass three times as much nitrobenzene over the catalyst prior to regeneration as in the case of a conventional bead catalyst whose particles have no cavities.

*Example 6*

64 kg. of a cobalt acetate solution containing 5% of cobalt is mixed with 70 kg. of 25% ammonia water. Then 10 kg. of powdered molybdic acid is stirred with 10 kg. of 25% ammonia water. The two batches are added together to 430 kg. of aluminum oxide hydrate paste containing 20% of $Al_2O_3$. The whole mixture is then stirred for two hours and 420 kg. per hour of the mixture is injected by means of a high pressure pump at a pressure of 50 atmospheres through a nozzle having a 2.5 mm. bore into the upper end of a drying tower having a height of 11 m. and a diameter of 3 m. At the same time 3000 cu. m. (S.T.P.) of dry air which has been heated to 500° C. is passed in at several points near the nozzle. The spray cone has an angle of 30°. The grain size characteristic of the dried hollow bead-shaped particles is $\delta^1=0.2$ and the uniformity coefficient $n=4$. 97% by weight have a diameter of more than 100 microns. The material is heated to 480° C. The finished alumina catalyst contains 4% of cobalt oxide and 10% of molybdic acid.

*Example 7*

12 kg. of molybdic acid is suspended in 250 liters of distilled water. 12 kg. of 25% ammonia water is slowly stirred in. A mixture of 2.1 kg. of 25% ammonia water and 1.8 kg. of 83% phosphoric acid and 21 kg. of ammonium vanadate is then added. The mixture is stirred intensely and evaporated until it has a pasty consistency. The content of dry substance is 58%. 240 kg./hour of the paste is sprayed into a drying tower having a height of 11 m. and a diameter of 1.9 m. through a nozzle having a 1.6 mm. bore at a pressure of 30 atmospheres. At the same time 875 cu. m. (S.T.P.) of dry air is passed in per kg. of paste near to the nozzle. The dry air has been preheated to 510° C. The temperature in the middle of the tower is 150° C. and the outlet temperature is 130° C. Grain sizes of the hollow spherical particles: $\delta^1=0.18$ and $n=3.2$. 90% of all the sieve constituents have a diameter of more than 90 microns.

*Example 8*

500 kg. of a silicic acid gel containing 17% of solids (which has been precipitated by stirring a waterglass solution into sulphuric acid at a pH less than 3 and the product washed with water) is mixed with 500 kg. of a silicic acid gel having 25% by weight of solids (which has been precipitated from the same initial components by introducing sulfuric acid into waterglass solution at pH less than 8 and washed with ammonia water). The mixture is ground in a corundum disc mill and injected at 60° C. through a nozzle having a 2.1 mm. bore into the above-mentioned drying tower at a pressure of 55 atmospheres. With an hourly throughput of 400 kg., 3500 cu. m. (S.T.P.) of dry air which has been heated to 600° C. is introduced at the same time at several points beside the nozzle. The temperature drops by 80° C. per meter from the gas inlet to the middle of the tower. 99% of the hollow beads obtained have a diameter of more than 90 microns. Grain size characteristic $\delta^1=25$; uniformity coefficient $n=5$. The hollow beads are heated for one hour at 650° C. They are then impregnated with 42 kg. of copper in the form of a 12% copper tetramine hydroxide solution, dried at 200° C. and heated for one hour at 600° C. A vertical cylindrical reactor having a ratio of diameter to height of 1:4 is filled to four-fifths of its free space with the catalyst. A grate is provided at the bottom of the vessel to ensure uniform distribution of the circulating gas supplied at the bottom. A cyclone is situated in the upper portion of the vessel which is widened to 1½ times, and entrained catalyst dust is separated in the cyclone. The vessel has twenty two-component nozzles arranged at different levels. The first group of eight nozzles is situated about one tenth of the height above the grate, the second group of seven nozzles is about one quarter of the height above the grate and the uppermost group of five nozzles is about one-third of the height above the grate. Air is first expelled from the reactor by introducing nitrogen, and then the catalyst is reduced with hydrogen at a temperature between 200° and 250° C. After the catalyst has been reduced, an operating pressure of 5 atmospheres is set up in the reactor and liquid nitrobenzene is sprayed into the reactor in finely divided form through the two-component nozzle by means of hydrogen. 65 kg. of nitrobenzene and 55 cu. m. (S.T.P.) of hydrogen are supplied per hour in uniform distribution through the twenty two-component nozzles by means of pumps. A pressure of 6 atmospheres is maintained in the reactor. The reaction gases leave the reactor through the cyclone and pass by way of a heat exchanger and condenser to a separator in which the aniline formed and the water are separated from the gas. The gas is returned to the process through a preheater by means of a circulating pump. 325 cu. m. (S.T.P.) of recycle gas is passed per hour upwards through the distributor grate, the hydrogen content being kept constant by adding 37.5 cu. m. (S.T.P.) per hour of fresh hydrogen.

In the rigidly arranged catalyst layer of the reactor, a sufficient number of tubes is arranged at a distance of 25 cm. form and parallel to the wall of the reactor to provide a cooling surface which will maintain a temperature of about 280° C. 49.15 kg. of aniline and 19 kg. of water are obtained per hour in the separator. The aniline is obtained by simple distillation in a purity of almost 100% and a content of nitrobenzene of less than 0.01% with a yield of 99.5% of the theory with reference to the nitrobenzene introduced. After a throughput of 270,000 kg. of nitrobenzene per cu. m. of catalyst filling, a slight amount of a residue occurs on the catalyst. The full activity of the catalyst may be restored by regenerating it with air at 350° C. and then reducing it again in the way described above.

We claim:

1. A process for production of catalysts and catalyst carriers in the form of hollow beads having cavities communicated with the outer sides of said beads by passages in said walls of said beads, which process comprises spraying into a spray-drying tower through at least one nozzle opening of 0.5–4 mm. at a spray pressure of 10–100 atmospheres a composition forming said beads upon drying in said tower, said composition being a hydrogel containing at least 30% water, a suspension of a metal compound in water or an organic, volatile liquid, a solution of a metal compound having thixotropic properties, or a hydrogel in admixture with a metal compound; concurrently introducing into said tower a gas heated to 300° C.–700° C. in an amount of 4 to 18 cubic meters of said gas per kilogram of said composition; incorporating into said composition prior to spraying thereof an expanding agent which is vaporizable or decomposable into vapor or gas at the temperaaure of the sprayed droplets of said composition in said tower; providing in said tower a mean temperature drop of at least 50° C. per meter from said nozzle to the middle of said tower; forming in the neighborhood of said nozzle an extensible but tough skin on the sprayed droplets; forming said droplets into hollow beads in which at least 80% have diameters of more than 90 microns; and bursting said skin of said beads in at least one place to provide passage to the inside of said hollow beads.

2. A process as claimed in claim 1, wherein a stream of cold gas is introduced additionally into said tower adjacent said nozzle to promote formation of said skin.

3. A process as claimed in claim 1, wherein said composition is a hydrogel selected from the group consisting of silica hydrogel, alumina hydrogel, and silica-titanium dioxide having a solids content of 15–40%.

4. A process as claimed in claim 1, wherein said composition is heated to 30° C.–90° C. before spraying thereof into said tower.

5. A process as claimed in claim 1, wherein said composition is a solution of a metal compound with thixotropic properties.

6. A proces as claimed in claim 1, wherein said composition is a hydrogel and contains 1–10% of particles obtained by grinding said hollow beads with the solids of said composition prior to spraying thereof.

7. A process as claimed in claim 1, wherein said hollow beads are then heated to a temperature of 400° C.–700° C., then impregnated with a catalytically active substance, and then heated again to 400° C.–700° C.

8. A catalyst composition comprising as the catalyst carrier spray dried, hollow beads in which at least 80% of said beads have diameters in excess of 90 microns and which are characterized by hollow shells ruptured to provide access though said shells to the respective cavities thereof, said catalyst carrier being produced by a process as claimed in claim 1.

References Cited
UNITED STATES PATENTS

| | | | |
|---|---|---|---|
| 3,120,495 | 2/1964 | Innes | 252—448 |
| 3,161,468 | 12/1964 | Walsh | 23—182 |

DANIEL E. WYMAN, *Primary Examiner.*

OSCAR R. VERTIZ, *Examiner.*

A. J. GRIEF, L. G. XIARHOS, *Assistant Examiners.*